United States Patent [19]
Ohta et al.

[11] Patent Number: 4,905,114
[45] Date of Patent: Feb. 27, 1990

[54] DISK DRIVE COMPATIBLE TAPE CARTRIDGE WITH DEVICE FOR POSITIONING THE TAPE RELATIVE TO THE DISK DRIVE

[75] Inventors: Toshiro Ohta, Kanagawa, Japan; Richard H. Henze, San Carlos, Calif.; Charles H. McConica, Windsor, Colo.; George Clifford, Los Altos Hills; Bruce F. Spenner, Los Gatos, both of Calif.

[73] Assignees: Hewlett-Packard Company, Palo Alto, Calif.; Sony Corporation, Japan

[21] Appl. No.: 296,916

[22] Filed: Jan. 12, 1989

Related U.S. Application Data

[63] Continuation of Ser. No. 945,607, Dec. 23, 1986, abandoned.

[30] Foreign Application Priority Data

Dec. 28, 1985 [JP] Japan .................................. 60-293526
Dec. 28, 1985 [JP] Japan ........................... 60-UM199944

[51] Int. Cl.⁴ ........................ G11B 5/78; G11B 17/04; G11B 25/10
[52] U.S. Cl. .................................... 360/132; 360/137; 242/197
[58] Field of Search ................................ 360/132–133, 360/137, 93, 96.3, 96.5; 242/55.19 A, 197–199

[56] References Cited

U.S. PATENT DOCUMENTS 4,492,998 1/1985 Kamimura et al. ................. 360/132
4,528,606 7/1985 Suchiya ........................... 242/199 X
4,654,740 3/1987 Katoku ............................. 360/132

Primary Examiner—John H. Wolff
Attorney, Agent, or Firm—John A. Frazzini; William H. F. Howard

[57] ABSTRACT

A disk-drive-compatible magnetic tape cartridge is provided with a tape guide for accurately positioning a magnetic tape in relation to a disk drive head. The tape guide includes a positioning section to be aligned with a rotation axis of a center core assembly when the center core assembly is chucked on a turntable of the disk drive. The tape guide also includes a guide section defining a tape run path across the disk drive head. The guide section is formed integrally with the section to be aligned with the center core assembly and so distanced from the latter as to accurately position the magnetic tape with respect to the disk drive head. Since the tape guide has the positioning section and guide section integrally, the distance therebetween can be maintained precisely constant. Therefore, tracking by the disk drive head becomes easier to allow high-density recording.

17 Claims, 6 Drawing Sheets

DISK DRIVE COMPATIBLE TAPE CARTRIDGE WITH DEVICE FOR POSITIONING THE TAPE RELATIVE TO THE DISK DRIVE

CROSS REFERENCE TO RELATED APPLICATIONS

This application is a continuation of Ser. No. 945,607, filed Dec. 23, 1986 now abandoned. This application is related to application Ser. No. 901,865, filed Aug. 29, 1986 by Ohta et al., application Ser. No. 945,592, filed Dec. 23, 1986 by Ohta et al. now abandoned and application Ser. No. 713,162, filed Mar. 18, 1985 now U.S. Pat. No. 4,796,136.

BACKGROUND OF THE INVENTION

1. Field of the Invention

The present invention related generally to a magnetic tape cartridge for use as a data storage medium. More specifically, the invention relates to a magnetic tape cartridge compatible with a disk drive and being particularly useful as back-up storage media for a computer and so forth which utilize magnetic disks. Further particularly, the invention relates to a magnetic tape cartridge incorporating a tape guide for accurately positioning a magnetic tape with respect to a disk drive head for enabling transfer of data between the magnetic tape and the disk drive head.

2. Description of the Background Art

Various magnetic disks and disk drives designed for use with associated disks have been developed and proposed for storing data. For example, the U.S. Pat. No. 4,445,155, issued on Apr. 24, 1984, to Takahashi et al, discloses one of typical constructions of a microfloppy disk, i.e. 3.5-inch floppy disk and disk drive therefor. The floppy disk is in a form of a floppy disk cassette or cartridge generally comprising a flexible magnetic disk and a cassette or cartridge casing. The flexible disk includes a center core disk designed to be chucked on a turntable of the disk drive. The disk drive drives the flexible disk and the center core disk to rotate.

Such floppy disks are useful for fast access. On the other hand, the floppy disks have limited data storage capacity. Archival or backup storage data stored on a hard disk generally takes 20 to 80 floppy disks due to their large capacity. This involves substantial expense for the user.

Magnetic tapes have conventionally been used as data storage medium. The magnetic tapes have much larger storage capacity than the floppy disk. On the other hand, the magnetic tapes are considered to be inconvenient when fast access for data is required. In other words, when fast access is not required, the magnetic tapes should be useful because of larger storage capacity. Therefore, as a backup storage for a hard disk, the magnetic tapes should be regarded as a useful and convenient medium to use.

As is well known, in order to perform recording and reproducing on magnetic tapes, a so-called "data recorder" which is a sort of magnetic tape recording and reproducing apparatus is needed. Whereas, recording and reproduction of data on the magnetic disks is performed by means of a disk drive. Consequently, in order to take the magnetic tapes as backup storage medium, both of data recorder and disk drive are required for copying data from the hard disk onto the magnetic tape storage medium. This is an additional expense for the users.

So as to allow the user to utilize magnetic tape for inexpensive backup storage of data on hard disks, or floppy disks, it would be beneficial to provide a magnetic tape cartridge compatible with floppy disk drives so that it may be driven by the same drive unit. For this purpose, there has been proposed a novel and useful disk-drive-compatible magnetic tape cartridge in the U.S. patent application Ser. No. 713,162, filed on Mar. 18, 1985. The same invention has been disclosed in the Japanese Patent First Publication (Tokkai) Showa 61-214188, published on Sept. 24, 1986. The proposed magnetic tape cartridge can utilize the read/write head or heads of a disk drive to write data and/or read data from the magnetic tape. The magnetic tape cartridge contains a tape media for data storage, a mechanism to register the tape with respect to a location, at which data is written to the tape or is read from the tape by the read/write head or heads of the disk drive, a mechanism for storing the tape media, and a mechanism to feed the tape past the read/write head or heads. The magnetic tape cartridge has a portion having an external shape and size which allow that portion to be inserted into the disk drive to enable the tape to be placed in the vicinity of the read/write head or heads.

The Henze's magnetic tape cartridge is successful in making the magnetic tape applicable -for the disk drive. However, there has arisen a difficulty in attempting to achieve high-density recording on the magnetic tape. This comes from difficulty in accurately positioning the magnetic tape with respect to the disk drive head. Namely, in the usual 3.5-inch floppy disk, such as that disclosed in Takahashi et al, is concerned, the magnetic disk is precisely co-axially formed with a center core disk. Therefore, by chucking the center core disk onto a turntable of a disk drive, the floppy disk can be accurately positioned with respect to the disk drive head. Therefore, recording tracks on the floppy disk can be precisely positioned at respectively predetermined positions for accurate tracking of the disk drive head. A mechanism to ensure that the tape is accurately registered with the read/write heads of the disk drive is disclosed in the U.S. patent application Ser. No. 713,162, filed Mar. 18, 1985. As disclosed in such application, guide pins are provided within the tape cartridge to accurately guide and locate the tape within the tape cartridge. The tape cartridge itself is aligned or registered with respect to the read/write heads of the disk drive accurately positioning the tape cartridge with respect to the disk drive in reference to three points. The microfloppy disk cassette normally used has a pair of holes in its protective shell. These holes fit over a pair of pins in the disk drive for accurately positioning the floppy disk with respect to the disk drive. The tape cartridge also includes a pair of holes which are positioned to fit over the pair of pins in the disk drive unit; these provide two of the three points of reference. The remaining point of reference is provided by a tight clearance fit between a circular hole at the center of the hub of a center core assembly in the tape cartridge to the disk drive spindle motor's circular shaft.

SUMMARY OF THE INVENTION

Therefore, it is a principal object of the present invention to provide a tape guide enabling high-density recording for a disk-drive-compatible magnetic tape cartridge.

Another and more specific object of the invention is to provide a tape guide which can accurately determine the tape position with respect to a disk drive head for enabling accurate tracking of the disk drive head.

In order to accomplish the aforementioned and other objects, a disk-drive-compatible magnetic tape cartridge, according to the present invention, is provided with a tape guide for accurately positioning a magnetic tape in relation to a disk drive head. The tape guide includes a positioning section to be aligned with a rotation axis of a center core assembly when the center core assembly is chucked on a turntable of the disk drive. The tape guide also includes a guide section defining a tape run path across the disk drive head. The guide section is formed integrally with the section to be aligned with the center core assembly and so distanced from the latter as to accurately position the magnetic tape with respect to the disk drive head.

As will be appreciated herefrom, since the tape guide has the positioning section and guide section integrally, the distance therebetween can be maintained precisely constant. Therefore, tracking by the disk drive head becomes easier to allow high-density recording.

According to one aspect of the invention, a disk-drive-compatible magnetic tape cartridge comprises a magnetic tape suitable for transferring data between a recording track formed thereon and a disk drive head, means for registering a portion of the tape at a location at which data can be transferred between the tape and the disk drive head, the registering means positioning the magnetic tape with respect to the disk drive head so that the magnetic tape is positioned at a predetermined distance from a rotation axis of the disk drive about which a magnetic disk rotates, means for feeding the tape past the location, and means for storing the tape.

The registering means may include a guide member for defining a tape run path past the location, the guide member being positioned at a predetermined position with respect to the disk drive head when the magnetic tape cartridge is loaded. The feeding means includes a driving means coupled with a driving shaft of the disk drive for rotatingly driving the magnetic disk, the driving shaft extending along the rotation axis, and the guide member having a portion to be aligned with the driving shaft for positioning the guide member at the predetermined position. The guide member is also defines a receptacle for receiving a positioning pin of the disk drive for positioning the guide member at the predetermined position with respect to the disk drive head in cooperation with the portion aligned with the driving shaft.

In the preferred construction, the guide member has a guide plan extending along the tape run path for guiding the magnetic tape therealong. The guide member has a resilient means for resiliently depressing the magnetic tape toward the guide plan.

The storing means may comprise a pair of tape reels wound therearound the magnetic tape. The tape reels are rotatable about rotation axes aligned to each other. The guide member includes means for turning tape running direction at approximately 90°.

According to another aspect of the invention, a magnetic tape cartridge suitable for transferring data between a magnetic tape and a disk drive head in a disk drive which is designed for driving a magnetic disk, comprises a cartridge casing acceptable in a disk drive and defining therein a tape run path across a disk drive for establishing communication between a magnetic tape and the disk drive for recording and reproducing a tape track formed on the magnetic tape, a tape drive mechanism for driving the magnetic tape along the tape run path, the tape driving mechanism being designed to selectively drive the magnetic tape both in forward and reverse directions, a center core assembly received within the cartridge casing and exposed therefrom to be chucked by a disk driving mechanism of the disk drive, the center core assembly including a chucking means active for establishing chucking engagement between the center core assembly and the disk driving mechanism for transmitting driving force of the driving mechanism to the tape drive mechanism, and a tape positioning means housed within the cartridge casing for positioning the magnetic tape in a predetermined position with respect to the disk drive head, the tape positioning means being coupled with the driving mechanism of the disk drive to position the magnetic tape at the predetermined position and being independent of the center core assembly.

The chucking means comprises a through opening defined in the center core assembly and having at least one corner, to receive a driving pin provided in the driving mechanism of the disk drive for fixingly receiving the driving pin at the corner for establishing the chucking engagement. The chucking pin is normally biased in a direction away from the corner. The center core assembly comprises a center core disk formed with a groove extending overall periphery thereof for engaging with a drive belt which transmit driving force transmitted to the center core disk to the tape drive mechanism.

The tape drive mechanism is cooperative with the tape reels for driving one of the latter according to the tape driving direction by transmitting driving force transmitted through the center core disk to one of the tape reels. The driving mechanism in the disk drive is designed to drivingly rotate with the center core disk of the magnetic tape cartridge in first direction for driving the magnetic tape in the forward direction and in second direction opposite to the first direction for driving the magnetic tape in the reverse direction.

In the preferred construction, the tape positioning means has a first portion to be aligned with a driving axis of the driving mechanism of the disk drive and a second portion located within the tape run path for positioning the magnetic tape at the predetermined position with respect to the disk drive head. The second portion has means for positioning the second means with respect to the disk drive by engaging with a positioning pin in the disk drive. The tape positioning means is provided with a positioning plan extending substantially along the tape run path for guiding the magnetic tape therealong. The tape positioning means is further provided with a bias means for constantly biasing the magnetic tape toward the positioning plan. The bias means is a resilient means for resiliently depressing the magnetic tape toward the positioning plan.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
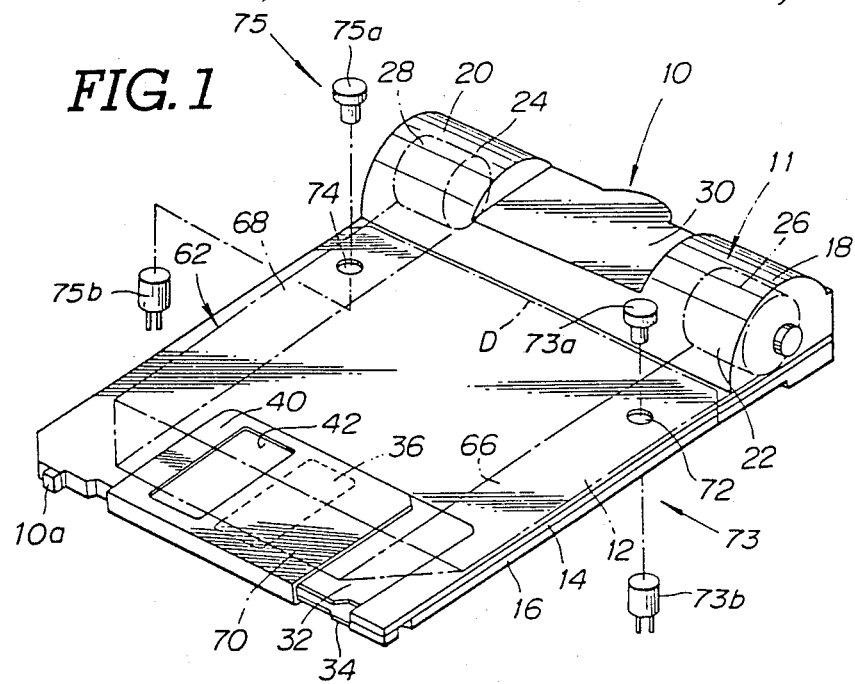
FIG. 1 is a perspective view of the preferred embodiment of a disk-drive-compatible magnetic tape cartridge according to the present invention.
Figure 2:
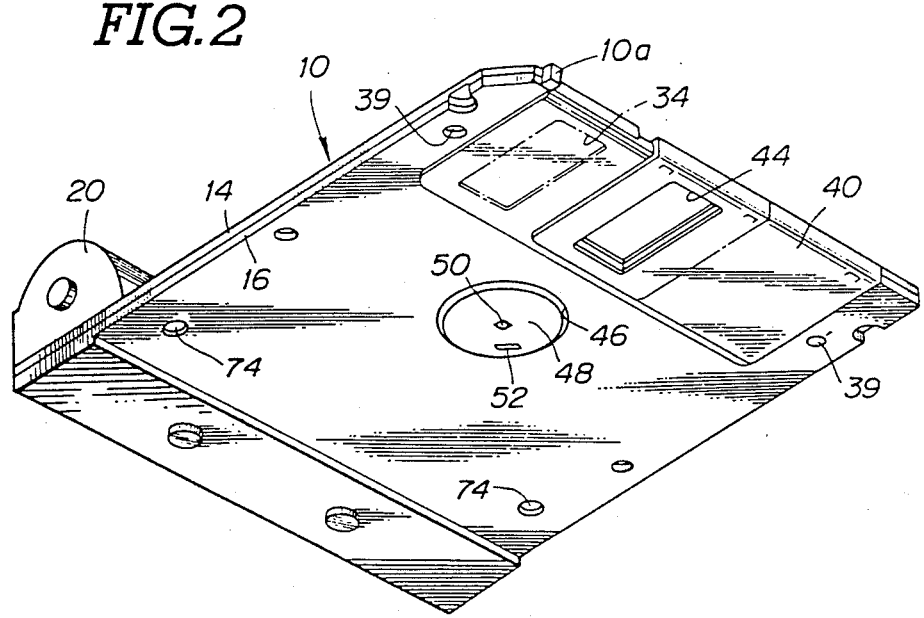
FIG. 2 perspective view of the preferred embodiment of the magnetic tape cartridge of FIG. 1, but showing the view as viewed from the bottom.
Figure 3:
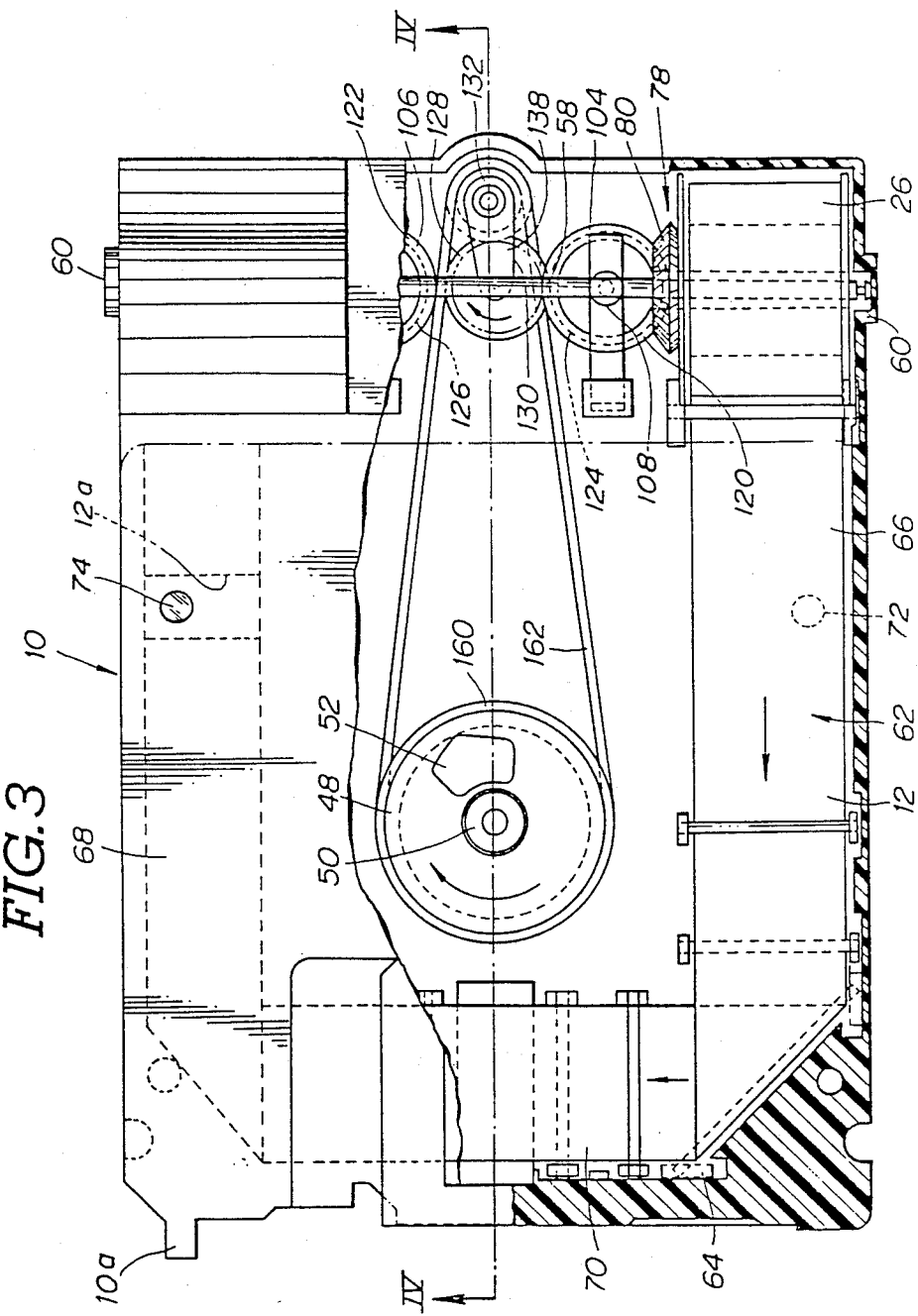
FIG. 3 is a plan view of the preferred embodiment of the magnetic tape cartridge of FIG. 1, in which a portion of an upper half of the cartridge is removed to show the preferred embodiment of the tape drive mechanism.

Referring now to the drawings, FIGS. 1 to 3 show the preferred embodiment of a magnetic tape cartridge 10 is formed into substantially thin, essentially rectangular box-shaped configuration, which is compatible with a disk drive for floppy disks of corresponding size, such as 3.5-inch microfloppy disks of the type disclosed in the U.S. Pat. No. 4,445,155.

It should be appreciated that the following discussion of the preferred embodiment of the magnetic tape cartridge according to the invention is directed to a specific type of magnetic tape cartridge, specifically, one designed for use with a 3.5-inch microfloppy disk drive. However, it should be also appreciated that the present invention is applicable to magnetic tape cartridges compatible with disk drives of any size. Furthermore, although the magnetic tape cartridge disclosed herebelow employs a magnetic tape having two ends respectively wound around supply and take-up reels, the magnetic tape cartridge of the invention may also employ an endless-loop-type tape.

The preferred embodiment of the magnetic tape cartridge comprises a cartridge 10 and a magnetic tape 12 housed within the interior of the cartridge. The cartridge 10 is made up of an upper half 14 and a lower half 16. The upper and lower halves 14 and 16 are of equal size in plan view and are fixed to each other to form the cartridge 10. The cartridge 10 is of essentially the same size and shape as the microfloppy disk cartridge disclosed in U.S. Pat. No. 4,445,155 as set forth above, but is longer than the disk cartridge. The length of the normal disk cartridge relative to the length of the magnetic tape cartridge is illustrated by the phantom-line D in FIG. 1. As will be appreciated herefrom, the preferred embodiment of the magnetic tape cartridge 10 has an extra section 11 which accommodates the tape reels, the tape drive mechanism and so forth. When this magnetic tape cartridge is loaded into a disk drive for which it is designed, the extra section 11 will remain outside of the disk drive, protruding from the opening of the disk drive.

As shown in FIGS. 1 and 2, the cartridge 10 is further formed with a projection 10a projecting from the front end of the cartridge. This projection 10a serves as an indicator for making the disk drive to recognize that the magnetic tape cartridge is used.

However, it would be possible to make the magnetic tape cartridge 10 match the floppy disk cartridge not only in the width and thickness but also in length, if necessary.

The upper half 14 has semi-cylindrical hollow extensions 18 and 20 near its rear corners and along its rear edge ("rear" referring to the direction of insertion into the disk drive). The semi-cylindrical hollow extensions 18 and 20 extend upwards from the upper surface of the upper half 14 and thus define tape reel receptacles 22 and 24 receiving a supply reel 26 and a take-up reel 28. A space 30 for a power train, which will be described in detail later, remains between the tape reel receptacles 22 and 24.

The upper and lower halves 14 and 16 have recesses 32 and 34 exposed to the outside on their upper and lower surfaces respectively. Longitudinally (with respect to the direction of insertion) elongated tape access apertures 36 and 38 are formed in the upper and lower halves 14 and 16 within the recesses 32 and 34. The tape access apertures 36 and 38 are aligned with each other to allow a disk drive head (not shown) of a disk drive access to the tape. The disk drive can be the same as or slightly modified from that disclosed in the foregoing U.S. Pat. No. 4,445,155. Therefore, the disclosure concerning the disk drive in the U.S. Pat. No. 4,445,155 is hereby incorporated by reference for the sake of disclosure.

The upper and lower halves 14 and 16 also have positioning holes 39 for positioning the tape cartridge 10 within the disk drive. The positioning holes 39 of the upper and lower halves 14 and 16 are aligned with each other and are designed to receive a positioning pin (not shown) built into the disk drive.

A sliding shutter 40 slidingly engages the recesses 32 and 34. Upper and lower surfaces of the sliding shutter 40 lie essentially flush with the upper and lower surfaces of the cartridge 10 as assembled. The sliding shutter 40 has longitudinally elongated apertures 42 and 44 of the same size and configuration as the tape access apertures 36 and 38 of the cartridge 10. The sliding shutter 40 is movable between a closed position, in which the apertures 42 and 44 offset from the tape access apertures 36 and 38 and thus hiding the tape 12 and an open position, in which the apertures 42 and 44 are aligned with the tape access apertures 36 and 38 to allow the disk drive head access to the tape. The sliding shutter 40 is normally biased by a spring (not shown) toward the closed position and is actuated to the open position when the magnetic tape cartridge is inserted into the disk drive.

The supply and tape-up reels 26 and 28 are rotatably supported by a support shaft 58, the ends of which are fixed to boss sections 60 formed on the side walls of the semi-cylindrical extensions 18 and 20 as shown in FIG. 3. Therefore, the supply and take-up reels 26 and 28 are mounted within the tape reel receptacles 22 and 24 with their axes lying transverse. A tape run path 62 is defined within the thin space defined in the front portion of the cartridge along which the magnetic tape passes between the tape access apertures 36 and 38. Tape guide assembly 64 defines the tape run path 62. As will be seen from FIGS. 1 and 3, the tape run path 62 has a first section 66 near the supply reel 26 and extending longitudinally along one edge of the cartridge, a second section 68 near the take-up reel 28 and extending longitudinally along the other edge of the cartridge, and a third section 70 extending laterally across the front edge and between the tape access apertures 36 and 38. At the junctures of the first section 66 and third section 70, and of the second section 68 and third section 70, the tape guides 64 are provided to deflect the tape.

In this disclosure, the word "longitudinal" used in connection with the tape path means the axis of movement along the first and second sections 66 and 68 of the tape run path 62 set forth above, and the word "lateral" used in connection with the tape path means the axis of movement along the third section 70 of the tape run path 62 set forth above.

In order to selectively drive the supply reel 26 and the take-up reel 28 for recording and/or reproduction in forward and reverse directions, the preferred embodiment of the magnetic tape cartridge according to the present invention, is provided with a specially designed tape drive mechanism. In general, the take-up reel 28 is driven to extract the magnetic tape 12 from the supply reel through the tape run path 62 during recording and reproduction. This tape direction will be hereafter referred to as "forward". On the other hand, the supply reel 26 must be driven to extract the magnetic tape 12 from the take-up reel 28 during rewinding. The supply reel 26 drives the magnetic tape 12 through the tape run path 62 in the direction opposite to the forward direction. This direction will hereafter be referred to as "reverse".

The tape drive mechanism includes a pair of bevel gear blocks 78 (only one is shown) as shown in FIG. 3. The bevel gear blocks 78 are generally cylindrical and have bevel gears 80 respectively at one end thereof. The bevel gear blocks 78 are co-axially mounted on the mutually opposing axial ends of the supply reel, 26 and the take-up reel 28. The bevel gear blocks 78 are rotatable with the supply reel 26 and the take-up reel 28.

A pair of intermediate gear blocks 104 and 106 are rotatably supported by gear shafts 108 and 110 extending vertically from the floor of the cartridge 10. The gear shafts 108 and 110 are arranged in lateral alignment at a given distance from each other. The distance between the gear shafts 108 and 110 is slightly greater than or approximately equal to twice the outer diameter of the intermediate gear blocks 104 and 106. The intermediate gear blocks 104 and 106 have bevel gears 120 and 122 respectively at their upper ends. Respective bevel gears 120 and 122 constantly engage the corresponding bevel gears 80 on blocks 78.

The intermediate gear blocks 104 and 106 also have plane gears 124 and 126 below the bevel gears 120 and 122. The plane gears 124 and 126 lie in the same horizontal plane at a given distance from each other. As set forth above, since the gear shafts 108 and 110 are separated by a distance slightly greater than or approximately equal to the outer diameter of the intermediate gear blocks 104 and 106, the distance between the plane gears 124 and 126 is slightly greater than the outer diameter thereof.

Figure 4:
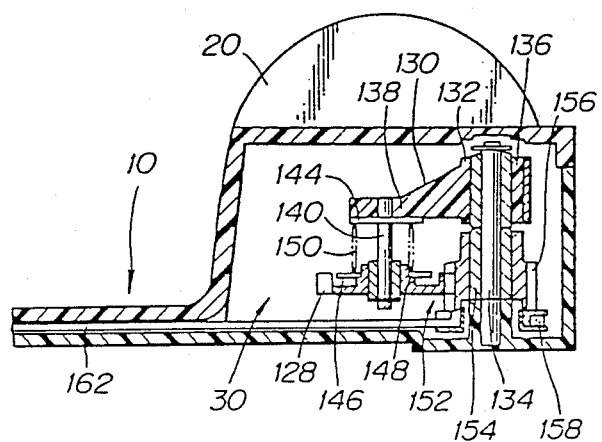
FIG. 4 is an enlarged longitudinal section of a portion of the preferred embodiment of the magnetic tape cartridge where a tape drive mechanism is provided, which section is taken along line IV—IV of FIG. 3.

As shown in FIGS. 3 and 4, a two-way coupling gear 128 is disposed between the plane gears 124 and 126. The two-way coupling gear 128 is mounted on a pivotal base 130. The pivotal base 130 has a cylindrical base section 132 pivotably mounted at the top of a pivot shaft 134 extending vertically from the floor of the cartridge 10. A sleeve bearing 136 is interposed between the inner periphery of the cylindrical base section 132 and the outer periphery of the pivot shaft 134 to allow pivotal movement of the pivotal base. The pivotal base 130 also has a pivoting arm 138. A gear shaft 140 extends downward from the pivotal arm 138. Adjacent its lower end, the gear shaft 140 mounts the two-way coupling gear 128. The two-way coupling gear 128 is rotatable about the gear shaft 140. A sleeve bearing 142 is disposed between the contacting faces of the gear shaft 140 and the two-way coupling gear 128.

An annular slip plate 144 loosely engages the gear shaft 140 for the two-way coupling gear 128. Also, an annular-disc-shaped spring seat 146 engages the stepped outer periphery 148 of the two-way coupling gear 128. A compression coil spring 150 is disposed between the slip plate 144 and the spring seat 146 to exert a biasing spring force on the slip plate 144 for frictional engagement with the lower surface of the pivoting arm 138. At the same time, the spring force of the compression coil spring 150 is exerted on the two-way coupling gear 128 through the spring seat 146. The slip plate 144 and the coil spring 150 constitute a clutch mechanism which causes the pivotal base to pivot so as to bring the two-way coupling gear 128 into engagement with one of the plane gears 124 and 126 of the intermediate gear blocks 104 and 106, depending on the direction of rotation of the two-way gear 128.

A drive gear block 152 is mounted at the lower end of the pivot shaft 134 through a sleeve bearing 154. The drive gear block 152 has a drive gear 156 constantly engaging the two-way coupling gear 128. The drive gear block 152 also has a pulley 158 integrally formed with the drive gear 156. The pulley 158 is connected to a pulley 160 integral with a center core disk 202 of a center core assembly 200, which will be described later, by means of a driving belt 162.

It should be appreciated that the gear ratio of the aforementioned tape drive mechanism is selected so as to drive the magnetic tape at a speed range equal to the speed range of a floppy disk on the same disk drive due to rotating the floppy disk. Specifically, the tape speed at the third section 70 of the tape run path 62 has to be equal to the rotation speed of the floppy disk, so that the disk drive can use the same recording and reproduction operations without adjustment.

For this purpose, speaking of a conventional 3.5 inch floppy disk, it rotates at about 600 r.p.m. so as to be free of peak-shift errors and data droppage. Therefore, if it is assumed that the linear velocity of the outermost track is $V_1$ and that of the innermost track is $v_2$, it is favorable that the feed rate v of the magnetic tape according to the invention be $v_2 < V < v_1$.

Figure 5:
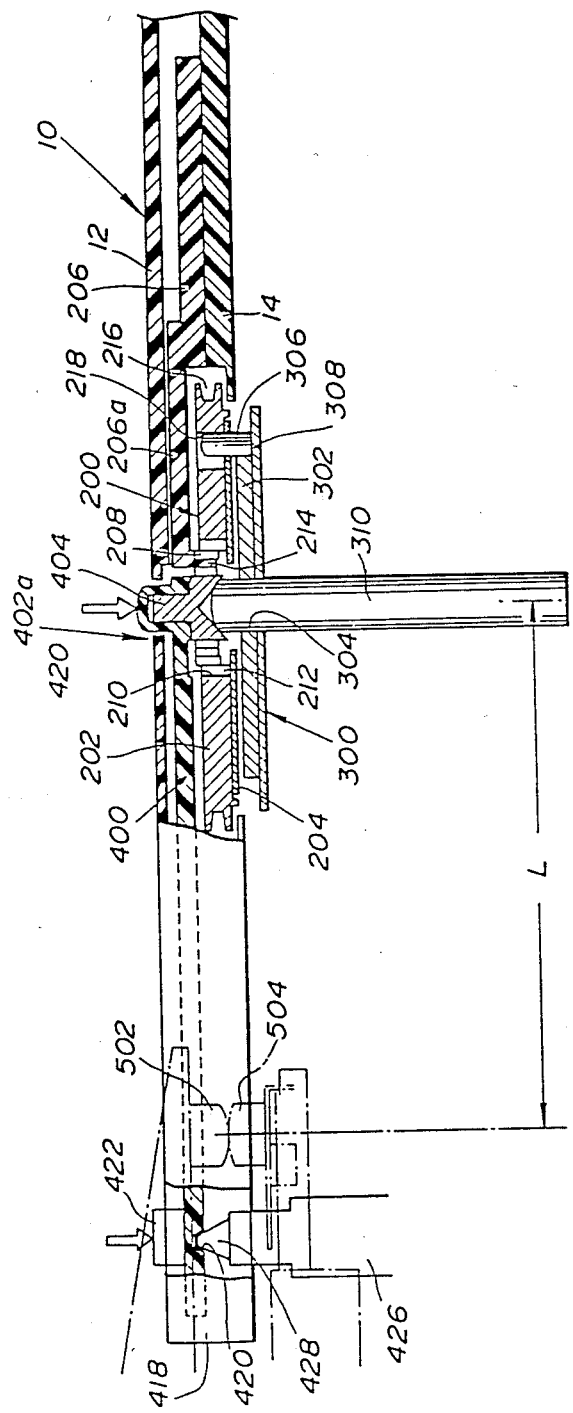
FIG. 5 is an enlarged section of a portion of the preferred embodiment of the magnetic tape cartridge where a center core, assembly and a tape guide are provided.

In order to drivingly couple the magnetic tape cartridge to a disk drive, a chucking mechanism is provided. As shown in FIG. 5, the chucking mechanism generally comprises a center core assembly 200 in the magnetic tape cartridge and a turn table assembly 300 in the disk drive. The center core assembly 200 is exposed through a central aperture 46 formed in the lower half 16 of the cartridge 10. The center core assembly 200 comprises a center core disk 202. The center core disk 202 is rotatably mounted on a support plate 206 which is fixed to the upper surface of the lower half 16. The support plate 206 has an essentially C-shaped end section 206a which defines a recess for receiving a part of the center core disk 202. The center core disk 202 is rotatably supported in the C-shaped end section 206a of the support plate 206 through a bearing 208, such as an oilless metal bearing, as shown in FIG. 5. In order to establish bearing contact with the outer periphery of the bearing 208, oilless metal bearing 212 in generally cylindrical form, is fixed onto the center positioning aperture 210 of the center core disk. The bearings 208 and 212 are loosely coupled with each other for allowing the center core disk 202 with the bearing 212 to displace with respect to the bearing 208 while it is chucked onto a turntable 302 of a driving mechanism 300 of the disk drive, which driving mechanism will be described later.

The center core disk 202 opposes the center aperture 46 in the lower half 16 and is thus exposed through the center aperture 46 of the lower half. The center core disk 202 is formed into essentially H-shaped configuration in cross-section and thus comprises an annular-disc form main section, as clearly shown in FIG. 5. The pulley 160 of FIG. 3 comprises center core disk 202 with an essentially V-shaped groove 216 formed on the outer periphery.

The center core disk 202 also defines a recess at the underside thereof. A driven plate 204 is received within the recess and fixed to the center core disk 202 for rotation therewith. The driven plate 204 is formed with a center positioning aperture 214 and a driving and positioning aperture 218. The driving and positioning aperture 218 is offset by a given distance from the center positioning aperture 214. The center positioning aperture 210 is designed to engage a disk drive motor spindle 310 through a metal fitting 404 which is fixedly mounted on a tape guide 400 which will be described later. On the other hand, the driving and positioning aperture 218 is designed to engage a driving pin 306 mounted on a turntable 302 of the disk drive through a resilient spring 308. The driving pin 306 is fixed to the resilient leaf spring 308 and normally biased upwardly. Therefore, the driving pin 306 extends upwardly through an aperture formed through the turntable 302 to engage with the driving and positioning aperture 218 of the center core disk 202. On the other hand, the turntable 302 is driven to rotate about the motor spindle 310. Therefore, the center core disk 202 is driven to rotate by the driving force transmitted through the turntable 302 of the disk drive with engagement of the driving and positioning aperture 218 and the driving pin 306 in per se well known manner. In order to establish chucking engagement between the driving pin 306 and the driving and positioning aperture 218, the leaf spring 308 is rotatingly biased by means of a bias coil spring.

As will be appreciated herefrom, when the magnetic tape 12 is to be driven, the driving pin 306 of the turntable 302 establishes clutching engagement with the driving and positioning aperture 218 of the driven plate 204 to rotatingly drive the center core disk, by contacting the periphery thereof against the peripheral edges in the vicinity of the corner of the driving and positioning aperture.

Figure 6:
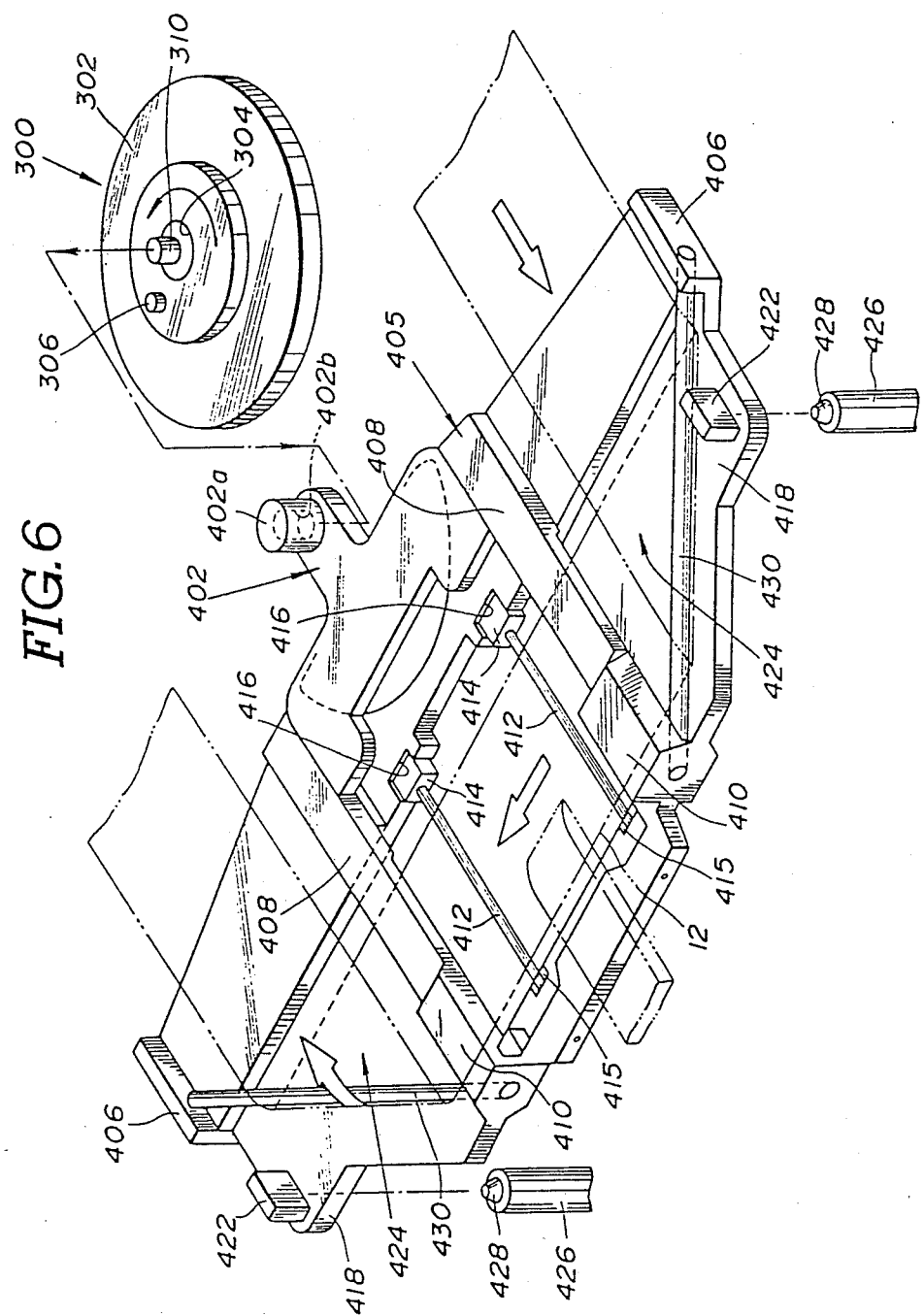
FIG. 6 is a perspective view of the preferred embodiment of the tape guide.
Figure 7:
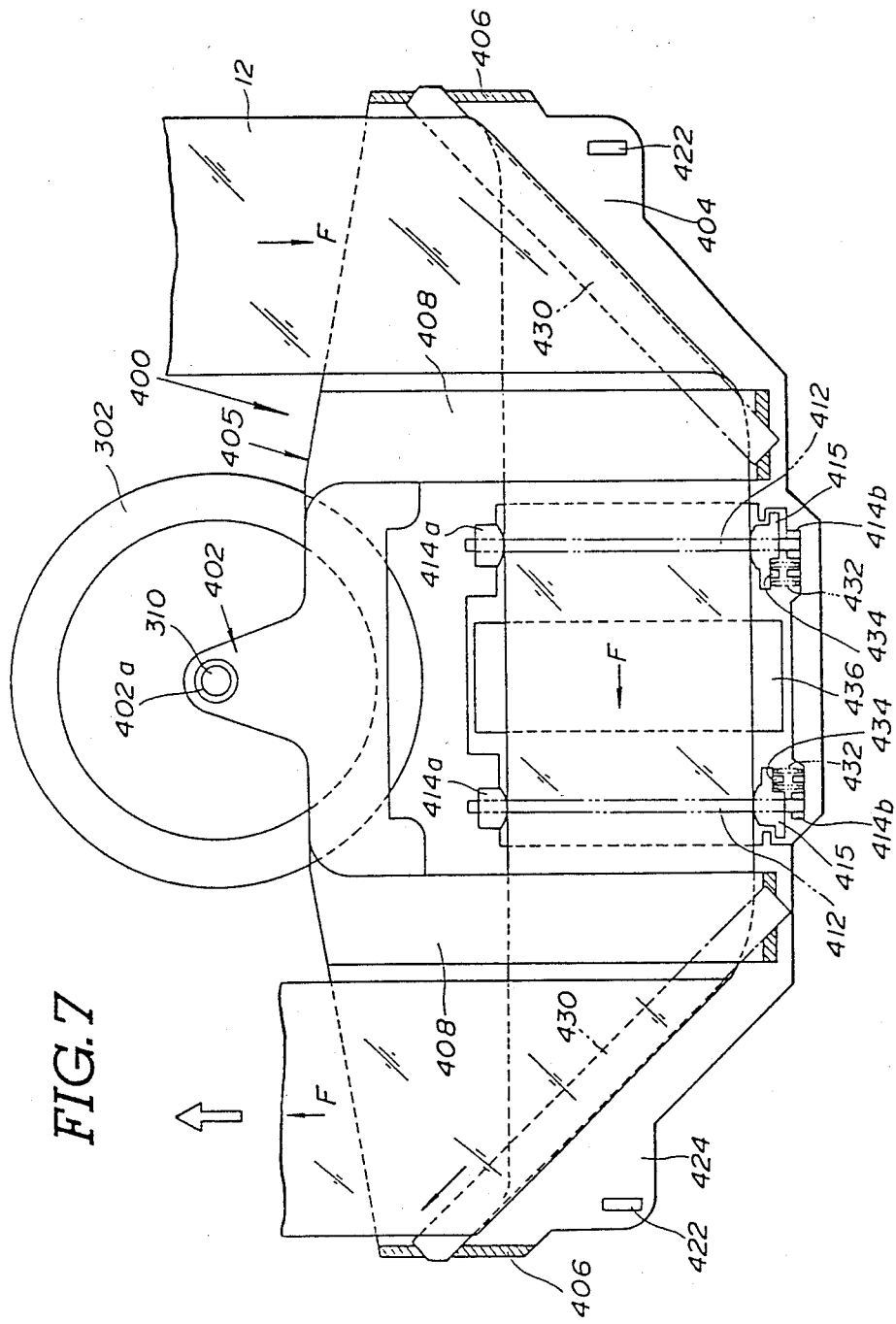
FIG. 7 is a plan view of the tape guide of FIG. 6.

In reference to FIG. 6, the tape guide 400 is provided for guiding the magnetic tape and defining the section 70 of the tape run path 62 across disk drive heads 502 and 504 (shown in FIG. 5). The tape guide 400 has a positioning section 402 to be aligned with the rotation axis of the center core disk 202 of the center core assembly 200 as set forth above. The positioning section 402 has a hollow cylindrical extension 402a defining a recess 402b. Upper end section of the metal fitting 404 is received within the recess 402b. The positioning section 402 is connected to a guide section 405 which defines the section 70 of the tape run path 62.

The guide section 405 has longitudinally extending and upwardly protruded sections 408. The sections 408 are integrally formed with blocks 410 for receiving one end of tape guide bars 430. The other ends of the guide bars 430 are secured to upward extensions 406 upwardly extended from the longitudinal side edge of the guide section 405. The guide bars 430 are arranged across sections 424 defined outsides of the sections 408 and extending in oblique with respect to longitudinally extending sections 66 and 68 and the laterally extending section 70. The magnetic tape 12 is wrapped around the guide bars 430 in order to turn the running direction from longitudinal direction to lateral direction and from lateral direction to longitudinal direction. Between the sections 408, another set of guide bars 412 are provided. The guide bars 412 extend essentially in longitudinal direction and fixedly fitting blocks 414a at the ends adjacent the positioning section. Fitting blocks 414b are also fixedly fitted to the other ends of the guide bars 412. Adjacent the fitting blocks 414 remote from the positioning section 402, movable fitting blocks 415 are movably fitted onto the other end of the guide bars 412. The movable fitting blocks 415 are normally biased toward the fitting blocks 414a by means of a bias coil springs 432 contacting against extensions 434 thereof. The movably fitting blocks 415 whereby constantly push the magnetic tape toward the positioning section 402 to resiliently maintain the tape position with respect to the tape guide 400. By this the distance L from the rotation axis of the center core disk 202 and the tape track to be accessed by one of the disk drive heads 502 and 504 can be maintained constant.

Essentially triangular extensions 418 are extended formed with the section 424. The extensions 418 are respectively formed with positioning recesses 420 (FIG. 5) to receive therein conical tops 428 of positioning pins 426 of the disk drive. Upwardly extending strips 422 are also protruded upwardly from the extensions 418. As shown in FIG. 5, the strips 422 extend upwardly through the upper half 14 so as to fix the position of the tape guide 400 with respect to the upper half 14 of the cartridge.

Upon loading the magnetic tape cartridge, a pusher member (not shown) in the disk drive depresses the top of the cylindrical extension 402 downwardly. As a result, the fitting block 404 comes into engagement with the top of the drive shaft 310 of the disk drive. At the same time, the upper edges of the strips 422 are depressed by another pusher member (not shown) of the disk drive to establish engagement between the recesses 420 and the conical tops 428 of the positioning pins 426. By these operations, the tape guide 400 is accurately positioned with respect to the disk drive head to accurately maintain the predetermined distance L between the recording track thereon and the rotation axis of the drive shaft 310. Since tracking of the disk drive head is radially performed with respect to the rotation axis of the drive shaft, tracking with respect to the magnetic tape positioned as set forth above, become accurate enough to allow high-density recording.

In order to drive the magnetic tape forward (from the supply reel 26 onto the take-up reel 28), the turntable is driven clockwise in FIG. 3. According to clockwise rotation of the turntable, the center core disk 48 is driven clockwise. The clockwise rotational force is transmitted from the pulley 160 of the center core disk 48 to the pulley 158 of the drive gear block 152 through the drive belt 162. Therefore, the drive gear 156 is driven to rotate clockwise in FIG. 3.

As long as the two-way coupling gear 128 remains free of the plane gears 124 and 126 of the intermediate gear blocks 104 and 106, the slip plate 144 maintains frictional engagement with the mating surface of the pivoting arm 138 of the pivotal base 130 due to the spring force of the coil spring 150. Therefore, the rotational force transmitted by the drive gear 156 of the drive gear block 152 to the two-way coupling gear 128 serves to drive the pivotal base 130 to pivot clockwise.

Once the two-way coupling gear 128 comes into engagement with the plane gear 126 of the intermediate gear block 106, pivotal movement of the pivotal base 130 is restricted. Then the rotational driving force transmitted by the drive gear 156 to the two-way coupling gear 128 overcomes the spring force of the coil spring 150 and so causes slip between the mating surfaces of the slip plate 144 and the pivoting arm 138. As a result, the two-way coupling gear 128 starts to rotate counterclockwise, thereby driving the plane gear 126 of the intermediate gear clockwise. The bevel gear 122 of the intermediate gear block 106 thus rotates clockwise, which causes the bevel gear 76 to drive the take-up reel 28 to wind in the magnetic tape 12.

When the magnetic tape cartridge 10 is unloaded and released from the disk drive, or otherwise, the turntable of the disk drive is forcibly stopped, coil springs (not shown) serve for restricting rotation of the intermediate gear blocks 104 and 106. Since the bevel gears 120 and 122 of the intermediate gear blocks 104 and 106 are constantly engaged with the bevel gears 80 and 82, rotation of the supply reel 26 and the take-up reel 28 is also restricted by means of the coil springs. Therefore, even when the magnetic tape cartridge is released from the turntable of the disk drive or the disk drive is stopped abruptly, slacking of the magnetic tape due to overrunning of the tape reel does not occur.

On the other hand, in order to switch from forward to reverse, the direction of rotation of the turntable is switched from clockwise to counterclockwise as viewed in FIG. 3. According to counterclockwise rotation of the turntable, the center core disk 48 is driven counterclockwise. The counterclockwise rotational force is transmitted from the pulley 160 of the center core disk 48 to the pulley 158 of the drive gear block 152 through the drive belt 162. Therefore, the drive gear 156 is driven counterclockwise in FIG. 3.

As long as the two-way coupling gear 128 remains free of the plane gear 124 of the intermediate gear block 104, the slip plate 144 maintains frictional engagement with the mating surface of the pivoting arm 138 of the pivotal base 130 due to the spring force of the coil spring 150 as the two-way coupling gear 128 becomes free from the clockwise rotational force of the drive gear 156. Therefore, the counterclockwise rotational force transmitted by the drive gear 156 of the drive gear block 152 to the two-way coupling gear 128 serves as a driving force for the pivotal base 130, causing the pivotal base to pivot counterclockwise in FIG. 3.

Once the two-way coupling gear 128 comes into engagement with the plane gear 124 of the intermediate gear block 104, pivotal movement of the pivotal base 130 is restricted. Then, the rotational driving force transmitted by the drive gear 156 to the two-way coupling gear 128 overcomes the spring force of the coil spring 150, causing slip between the mating surfaces of the slip plate 144 and the pivoting arm 138. As a result, the two-way coupling gear 128 starts to rotate clockwise, thus driving the plane gear 124 of the intermediate gear 104 counterclockwise. The bevel gear 120 of the intermediate gear block 104 is thus rotated clockwise, causing the bevel gear 74 to drive the supply reel 26 to rewind the magnetic tape 12.

In the preferred embodiment, magnetic tape 12 ¾-inch wide is employed in the magnetic tape cartridge. In this case, 80 recording tracks can be formed, which corresponds to the number that can be formed on a 3.5-inch floppy disk. Each track formed on the tape extends longitudinally along the tape. It will be appreciated that the length of each track depends solely on the length of the tape and so can be essentially longer than the length of the recording tracks formed on 3.5-inch floppy disks. In general, the capacity of each track on the magnetic tape will be several tens of times greater than that of a track on a floppy disk. If the tape is 12m long, the capacity of the magnetic tape cartridge will be approximately 20 megabytes.

Figure 8:
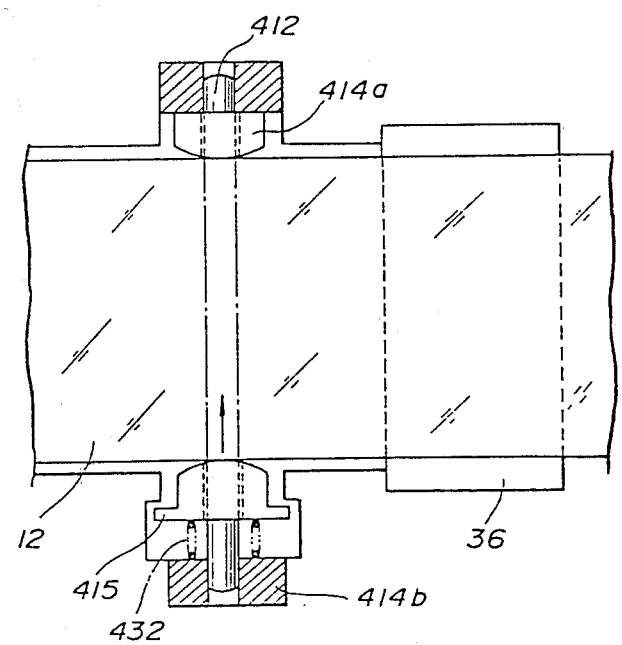
FIG. 8 is a partial plan view of a modified embodiment of the tape guide.

Although the aforementioned embodiment, employs a coil spring 432 provided offset from the guide bars 412 for biasing the movable fitting blocks 415 toward the positioning section 402 through the extension 434, for resiliently maintaining the magnetic tape at predetermined position, it would be possible to wind the coil springs around the guide bars 412, as shown in FIG. 8. In this case, the movable fitting 415 receives one end of the coil spring 432 at the end plan mating the fitting block 414b. The other end of the coil spring 432 is seated on the fitting block 414b.

As will be appreciated herefrom, since the preferred embodiment of a magnetic tape cartridge is provided with a tape guide which can accurately position the magnetic tape with respect to the disk drive head, tracking of the disk drive head becomes easier. As a result, high-density recording becomes possible. It will be appreciated that the magnetic tape employed in the preferred embodiment of the magnetic tape cartridge can be tracked by means of conventional tracking mechanisms employed in conventional disk drives.

As will be appreciated herefrom, the preferred embodiment of the magnetic tape cartridge according to the present invention can provide a very large data storage capacity. Therefore, this magnetic tape cartridge is suitable for use as backup storage for hard-disks or floppy disks. Furthermore, this magnetic tape cartridge can be utilized in a filing system which requires high-capacity memory media. In addition, the magnetic tape cartridge according to the present invention provides functions of automatically stopping the tape drive at the tape end and/or of automatically reversing tape driving direction.

Furthermore, the present invention is applicable not only for the specific type of the disk-drive-compatible magnetic tape cartridge but also any types of the magnetic tape cartridge compatible with the disk drive. For example, the present invention can be implemented with respect to various embodiments of the magnetic tape cartridges disclosed in the aforementioned copending U.S. patent application Ser. No. 713,162. The disclosure of the above-identified co-pending U.S. patent application is herein incorporated for the sake of disclosure.

What is claimed is:

1. A magnetic tape cartridge suitable for transferring data between a magnetic tape and a disk drive head in a disk drive which is designed for driving a magnetic disk, comprising:
   a cartridge casing acceptable in a disk drive and defining therein a tape run path across a disk drive for transferring data between a magnetic tape and said disk drive for recording and reproducing a tape track formed on said magnetic tape;
   a tape drive mechanism for driving said magnetic tape along said tape run path, said tape driving mechanism being designed to selectively drive said magnetic tape both in forward and reverse directions;
   a center core assembly received within said cartridge casing and exposed therefrom to be chucked by a disk driving mechanism of said disk drive, said center core assembly including a chucking means active for establishing chucking engagement between said center core assembly and said disk driving mechanism to said tape drive mechanism, and
   a tape positioning means housed within said cartridge casing for positioning said magnetic tape in a predetermined position with respect to said disk drive head, said tape positioning means including a positioning section and tape guide section, said sections being integrally formed wherein alignment of the positioning section with the rotation axis of the said center core assembly results in highly accurate tracking of said disk drive head with respect to said magnetic tape.

2. A magnetic tape cartridge as set forth in claim 1, wherein said chucking means comprises a through opening defined in said center core assembly and having at least one corner, to receive a driving pin provided in said driving mechanism of said disk drive for fixingly receiving said driving pin at said corner for establishing said chucking engagement.

3. A magnetic tape cartridge as set forth in claim 2, wherein said chucking pin is normally biased in a direction away from said corner.

4. A magnetic tape cartridge as set forth in claim 1, wherein said center core assembly comprises a center core disk formed with a groove extending over all of the periphery thereof for engaging with a drive belt to transmit a driving force from said center core disk to said tape drive mechanism.

5. A magnetic tape cartridge as set forth in claim 4, wherein said cartridge casing houses a pair of tape reels for winding and storing magnetic tape.

6. A magnetic tape cartridge as set forth in claim 5, wherein said tape reels have rotation axes aligned to each other.

7. A magnetic tape cartridge as set forth in claim 6, wherein said tape drive mechanism is cooperative with said tape reels for driving one of the latter according to the tape driving direction by transmitting a driving force from said center core disk to said one of tape reels.

8. A magnetic tape cartridge as set forth in claim 7, wherein said driving mechanism in said disk drive is designed to drivingly rotate with said center core disk of said magnetic tape cartridge in a first direction for driving said magnetic tape in said forward direction and in a second direction opposite to said first direction for driving said magnetic tape in said reverse direction.

9. A magnetic tape cartridge as set forth in claim 1, wherein said tape positioning means has a first portion to be aligned with a driving axis of said driving mechanism of said disk drive and a second portion located within said tape run path for positioning said magnetic tape at said predetermined position with respect to said disk drive head.

10. A magnetic tape cartridge as set forth in claim 9, wherein said second portion has means for positioning said second means with respect to said disk drive by engaging with a positioning pin in said disk drive.

11. A magnetic tape cartridge as set forth in claim 10, wherein said tape positioning means is provided with a positioning section extending substantially along said tape run path for guiding said magnetic tape therealong.

12. A magnetic tape cartridge as set forth in claim 11, wherein said tape positioning means is further provided with a bias means for constantly biasing said magnetic tape toward said positioning section.

13. A magnetic tape cartridge as set forth in claim 12, wherein said bias means is a resilient means for resiliently depressing said magnetic tape toward said positioning section.

14. A magnetic tape cartridge as set forth in claim 13, wherein said positioning means includes a deflector means for deflecting tape run direction at about 90°.

15. A magnetic tape cartridge as set forth in claim 12, wherein said tape positioning means is further provided with protrusions and recesses for alignment of said tape positioning section with said disk drive head by means of existing pusher members and positioning pins of said disk drive.

16. A magnetic tape cartridge as set forth in claim 15, wherein said alignment means of said disk drive comprises:
   (a) pusher members for depressing parts of said tape guide section;
   (b) a drive shaft for engaging said positioning section;
   (c) positioning pins for engaging parts of said tape guide section, and
wherein said engaging means of said integrally formed positioning section and tape guide section comprises:
   (d) extending strips on said tape guide section for engaging said pusher members;
   (e) a fitting block on said positioning section for engaging said drive shaft, and
   (f) recesses in said tape guide section to be engaged by said positioning pins.

17. A magnetic tape cartridge as set forth in claim 15, wherein said alignment means includes positioning pins for engaging said tape guide section, wherein said cartridge casing has therein holes which permit said positioning pins of said disk drive to engage said tape guide section engaging means.

* * * * *